United States Patent [19]
Jung

[11] Patent Number: 5,878,006
[45] Date of Patent: Mar. 2, 1999

[54] TRACK CROSS SIGNAL CORRECTION APPARATUS

[75] Inventor: Won-Seok Jung, Sungnam, Rep. of Korea

[73] Assignee: Samsung Electronics Co., Ltd., Kyungki-Do, Rep. of Korea

[21] Appl. No.: 853,749

[22] Filed: May 9, 1997

[30] Foreign Application Priority Data

May 9, 1996 [KR] Rep. of Korea .................. 1996-15275

[51] Int. Cl.$^6$ ...................................... G11B 7/00
[52] U.S. Cl. ...................................... 369/44.28
[58] Field of Search .................. 369/44.28, 44.29, 369/44.34, 44.32, 124, 59; 360/78.01, 78.04, 78.05, 73.03

[56] References Cited

U.S. PATENT DOCUMENTS

| | | | |
|---|---|---|---|
| 5,199,017 | 3/1993 | Kagami et al. | 369/44.28 |
| 5,426,625 | 6/1995 | Bui et al. | 369/44.28 |
| 5,428,591 | 6/1995 | Lee | 369/44.28 |
| 5,459,705 | 10/1995 | Matoba et al. | 369/44.28 |
| 5,473,587 | 12/1995 | Hamaguchi et al. | 369/44.28 |

FOREIGN PATENT DOCUMENTS

| | | |
|---|---|---|
| 0 505 252 A2 | 9/1992 | European Pat. Off. . |
| 0 514 773 A2 | 11/1992 | European Pat. Off. . |
| 0 550 302 A2 | 7/1993 | European Pat. Off. . |
| 04178925 | 6/1992 | Japan . |
| 05114145 | 5/1993 | Japan . |

*Primary Examiner*—Thang V. Tran
*Attorney, Agent, or Firm*—Sughrue, Mion, Zinn, Macpeak & Seas, PLLC

[57] ABSTRACT

A track cross signal correction apparatus removes noise components contained in a track cross signal. The apparatus includes mask signal generator for comparing pulse widths of the received track cross signals with threshold values, based on the pulse width of a previous track cross signal. A mask signal is generated according to the comparison result. A corrector outputs a received track cross signal when mask signals are generated from the mask signal generator. The track cross signal correction apparatus accurately performs a track seek operation in a medium such as a CD-ROM which requires high-speed access.

19 Claims, 4 Drawing Sheets

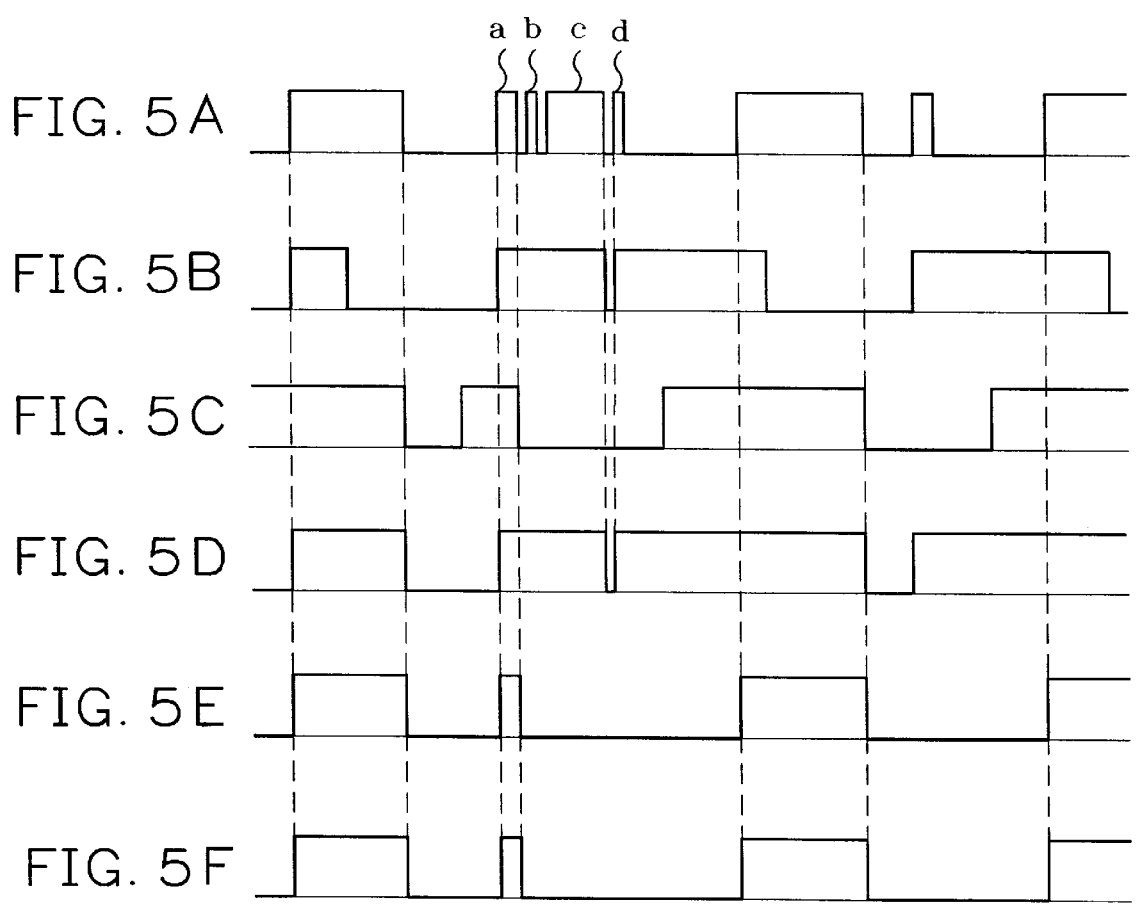

5,878,006

TRACK CROSS SIGNAL CORRECTION APPARATUS

BACKGROUND OF THE INVENTION

The present invention relates to in general to an optical disk system, and more particularly, to a track cross signal correction apparatus for seeking tracks in an optical disk system.

In general, an optical disk system seeks tracks in order to find a desired track. Both direct and indirect seek methods are used to locate a track. In such methods, a track cross signal is counted to perform a more efficient direct seek. The optical disk system utilizes a tracking error signal as shown in FIG. 2A, which is obtained from a beam reflected from a disk for a tracking control operation. The tracking error signal is obtained from an optical beam crossing the tracks on the disk, and is compared with a predetermined level to obtain a track cross signal as shown in FIG. 2B. The track cross signal represents the number of tracks on the disk that have been traversed.

Meanwhile, when signal recording surfaces of the disk are contaminated with foreign matter and/or the disk is swayed during rotation, the intensity of the beam reflected from the disk is lowered, thereby distorting the waveform of the tracking error signal as shown by "a" in FIG. 2A. If the waveform of the tracking error signal is distorted, the track cross signal becomes inaccurate. Thus, the track cross signal must be corrected before it is counted.

FIG. 1 shows a conventional track cross signal correction apparatus in a general magneto-optical disk system. When first and second counters 11 and 15 receive a track cross signal, the counters 11 and 15 count the number of reference clock pulses with respect to a high-level pulse T1 of the track cross signal, and outputs the count values representing the width of the pulse T1 of the track cross signal, as shown in FIG. 2B. The first counter 11 outputs the count value to a shift register 13 and an adder 17. The second counter 15 outputs the count value to a comparator 19. The shift register 13 shifts the binary count value by one bit to the right to generate and output half the count value. The adder 17 adds the output value of the first counter 11 and the output value of the shift register 13, and outputs a count value C representing one and a half the width of the pulse T1. The count value C becomes a reference value for judging whether a pulse is missing at a point where the pulse should exist. During the time when the reference count value C is generated via the shift register 13 and the adder 17, the counters 11 and 15 perform a count operation with respect to a next high-level pulse T2. The second counter 15 and the adder 17 output the respective output values to the comparator 19. The comparator 19 compares the reference count value C output from the adder 17 with the count value D output from the second counter 15. As a result, if C<D, that is, the next pulse is not generated during the time corresponding to one and a half of the previous pulse width T1, it is determined that the pulse following the pulse T1 is missing. In this case, the comparator 19 generates a control signal to insert the missing pulse thereinto.

In cases when a track seek operation is performed in an optical disk, such as a compact disk (CD) using the FIG. 1 apparatus, noise components and glitches tend to occur and concentrate at the zero crossing portion of a tracking error signal (as shown in FIG. 3A), due to a scattering beam being reflected when the optical beam passes through an edge portion of the pit and because of electrical noise resulting. The glitches are indicated by "b" in FIG. 3A. If a track cross signal is generated because of the tracking error signal, the glitch will still exist in the track cross signal as shown by "c" in FIG. 3B. The apparatus illustrated in FIG. 1 does not remove the glitches which exist at the edge of the track cross signal. Thus, since the glitch is incorrectly counted as a track cross pulse, an accurate track seek operation cannot be accomplished.

SUMMARY OF THE INVENTION

To solve the above problems of the conventional art, it is an object of the present invention to provide a track cross signal correction apparatus capable of removing noise components generated at the edge of a track cross signal according to the characteristics of a recording medium.

To accomplish the above and other objects of the present invention, there is provided a track cross signal correction apparatus for removing noise components contained in a track cross signal. The track cross signal correction apparatus includes means for respectively comparing pulse widths of the received track cross signal with threshold values based on the pulse width of a previous track cross signal, and generating mask signals according to the comparison result, and correction means for outputting a received track cross signal when mask signals are generated from the mask signal generation means.

BRIEF DESCRIPTION OF THE DRAWINGS

The preferred embodiment is described with reference to the drawings wherein:

FIGS. 5A through 5F are output waveform diagrams of the respective elements of FIG. 4.

DETAILED DESCRIPTION OF A PREFERRED EMBODIMENT

A preferred embodiment of the present invention will be described with reference to the accompanying drawings.

Figure 4:
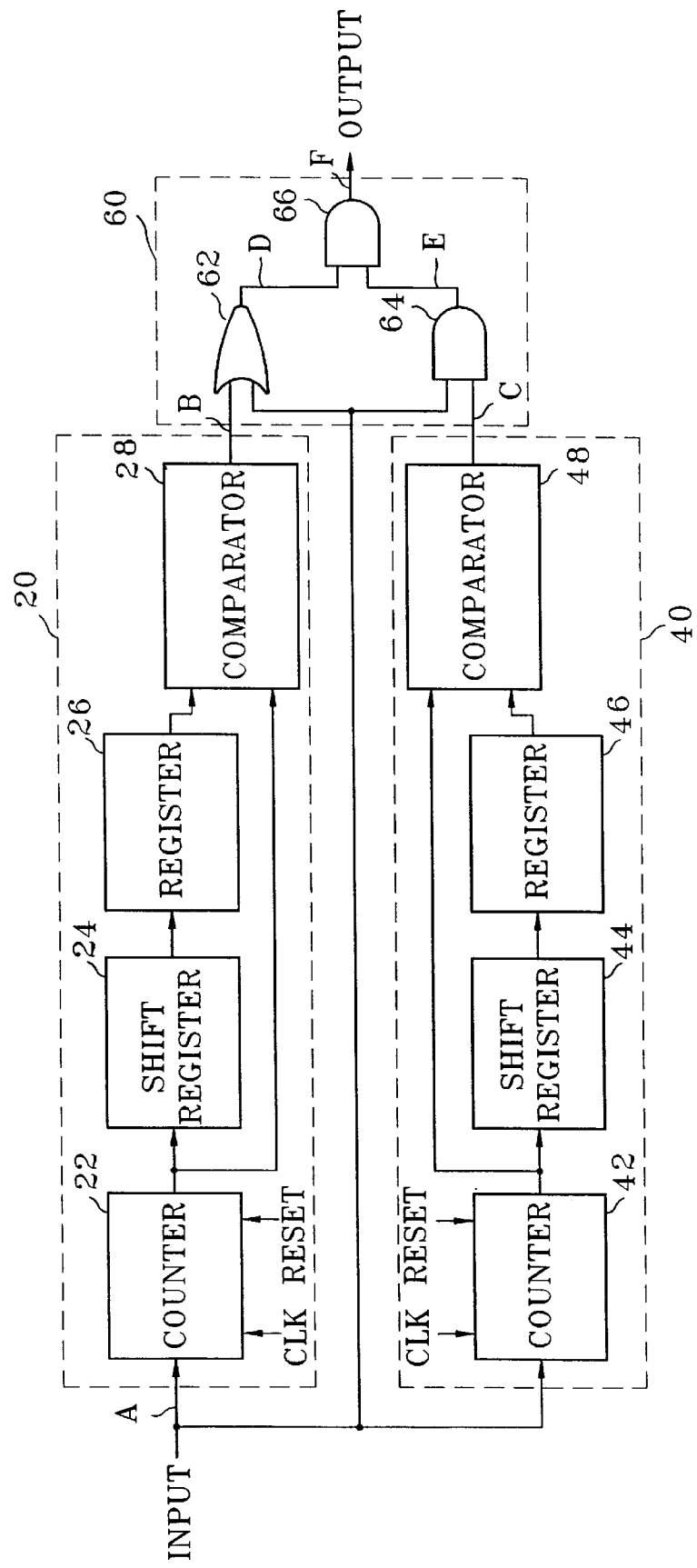
FIG. 4 is a block diagram showing a correction apparatus for correcting a track cross signal according to the present invention.

In FIG. 4, mask signal generators 20 and 40 each receive a track cross signal to be corrected. A counter 22 in the first mask signal generator 20 generates a count value representing a high-level pulse width of the received track cross signal. The count value is reduced by a predetermined multiple in a shift register 24. The register 26 temporarily stores the reduced count value. The count value generated by the counter 22 is applied to a comparator 28. The comparator 28 compares the output value of the register 26 with the output value of the counter 22, and generates a first mask signal according to the comparison result. The second mask signal generator 40 has the same construction as that of the first mask signal generator 20, and performs the same operation as that of the first mask signal generator 20 with respect to a low-level pulse of the track cross signal, to generate a second mask signal accordingly.

A corrector 60 includes an OR gate 62 which logically sums the output of the comparator 28 in the first mask signal generator 20 and the level of the track cross signal to be corrected. A first AND gate 64 logically multiplies the output of a comparator 48 in the second mask signal generator 40 and the level of the track cross signal to be corrected. A second AND gate 66 logically multiplies the outputs of the OR gate 62 and the first AND gate 64, and generates a corrected track cross signal.

The operation of the FIG. 4 apparatus having the above construction will now be described with reference to FIGS. 5A through 5F.

The first and second mask signal generators 20 and 40 receive a track cross signal as shown in FIG. 5A, respectively. The counter 22 of the first mask signal generator 20 counts the number of reference clock CLK periods during the time when the track cross signal is in the high-level state. If the count value is input from the counter 22, the shift register 24 shifts the count binary value by one bit to the right and outputs the shifted result. The register 26 temporarily stores half the count value output from the shift register 24. During the time when the shift register 24 and the register 26 perform the above-described operations, the counter 22 performs a count operation with respect to a next high-level pulse. The counter 22 performs a count operation with respect to the high-level pulse, and then is reset by an external reset signal RESET. Thus, the counter 22 begins a counting operation at the rising edge of the received pulse, and increases the count value from an initial value each time the counter 22 begins counting. The counter 22 outputs the count value to the comparator 28, and simultaneously the register 26 outputs the stored count value to the comparator 28. The count value output from the register 26 to the comparator 28 is used as a threshold value for determining whether the next high-level pulse is a noise component or an effective track cross signal pulse. The comparator 28 outputs a high-level first mask signal at the rising edge of the track cross signal. The comparator 28 compares the threshold value with the count value with respect to the high-level of the received track cross signal, and outputs the high-level first mask signal until the count value equals the threshold value.

The operation of the comparator 28 will be described below with reference to the first mask signal shown in FIG. 5B. In FIG. 5A, the count value with respect to the pulse "a" is smaller than the threshold value. If a low-level track cross signal is received after the pulse "a" lapses, the comparator 28 maintains the level of the first mask signal during the time when the track cross signal is in a low-level. If a pulse "b" is input, the comparator 28 again performs a comparison operation. Since a count value of the pulse "b" is also smaller than the threshold value, the comparator 28 continues to output the first mask signal as a high-level. When a pulse "c" is input, the comparator 28 again performs a comparison operation, and inverts the level of the first mask signal into a low-level and outputs the inverted result if the count value equals the threshold value. If a pulse "d" is input thereto, the comparator 28 outputs a high-level first mask signal again.

The second mask signal generator 40 performs the same operation as that of the first mask signal generator 20 with respect to the low-level pulse of the track cross signal. The comparator 48 in the second mask signal generator 40 generates a low-level second mask signal at the falling edge of the track cross signal. Also, the comparator 48 maintains and outputs the second mask signal as a low-level until the count value with respect to the low-level pulse equals the threshold value representing half the previous low-level pulse, while the comparator 48 inverts and outputs the second mask signal into a high-level when the former is larger than the latter. The second mask signal is shown in FIG. 5C.

The OR gate 62 in the corrector 60 logically sums the levels of the FIGS. 5A and 5B signals. The first mask signal is used for recognizing an input pulse as a glitch and masking the input pulse when a next pulse is input within the time determined as half the previous high-level interval. The OR gate 62 generates a track cross signal masked by the first mask signal according to the operation result, as shown in FIG. 5D. The first AND gate 64 logically multiplies the levels of the signals illustrated in FIGS. 5A and 5C and generates a track cross signal masked by the second mask signal according to the operation result, as shown in FIG. 5E. The second AND gate 66 logically multiplies the levels of the signals illustrated in FIGS. 5D and 5E and generates a corrected track cross signal. It can be seen that the track cross signal shown in FIG. 5F is a signal obtained by removing four pulses recognized as a glitch from the FIG. 5A track cross signal.

In the above-described embodiment, it has been described that a threshold value is half the previous pulse width. It is however possible to design a threshold value being a quarter of the previous pulse width, by making shift registers 24 and 44 shift input bits by two bits to the right, respectively.

Figure 1:
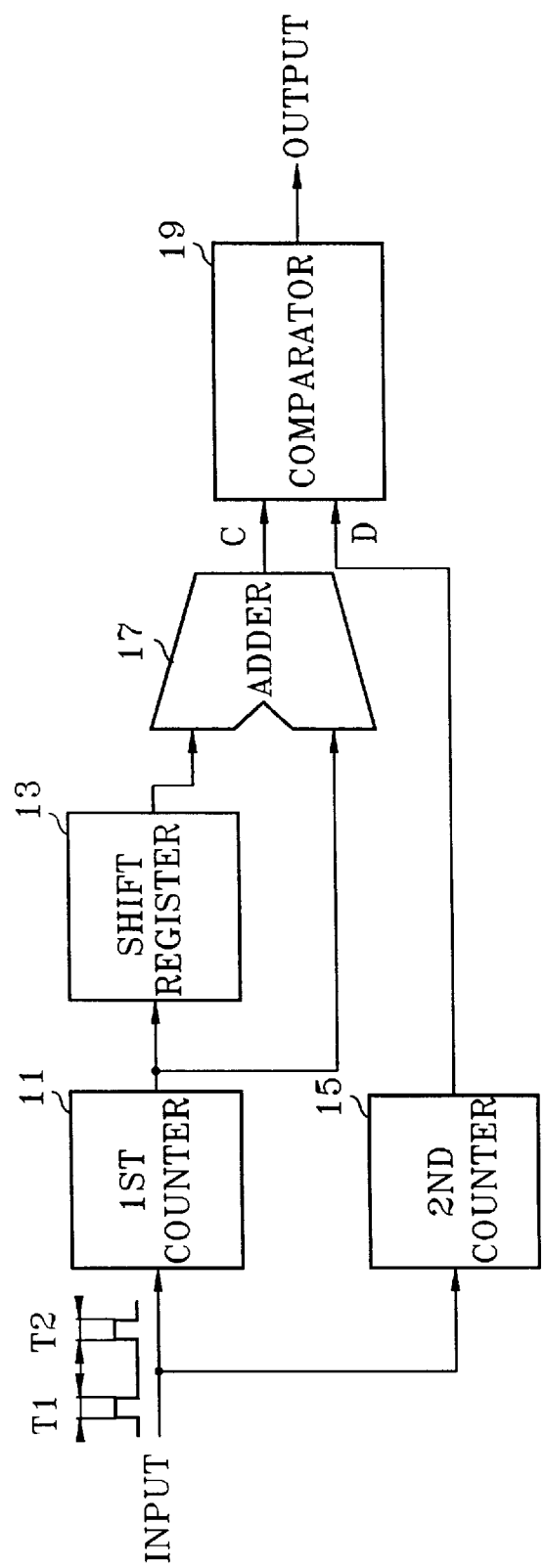
FIG. 1 shows a track cross signal correction apparatus in a conventional magneto-optical disk system.
Figure 2A:
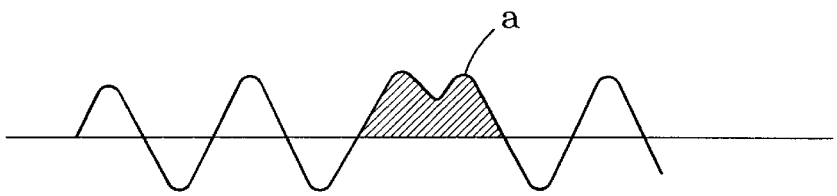
FIGS. 2A and 2B illustrate a tracking error signal and a track cross signal according to the characteristics of a magneto-optical disk, respectively.
Figure 2B:
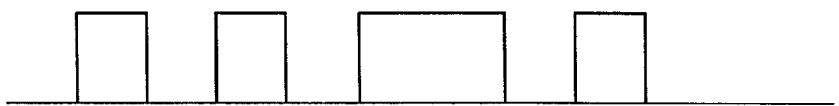
Figure 3A:
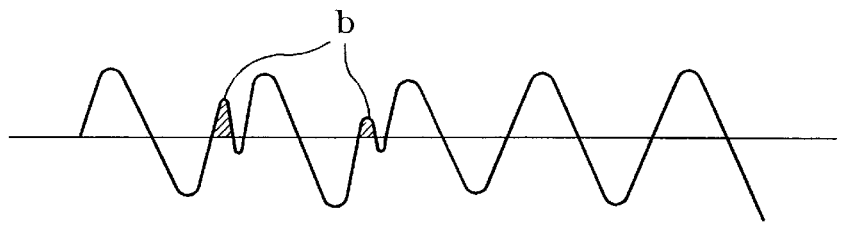
FIGS. 3A and 3B show a tracking error signal and a track cross signal according to the characteristics of an optical disk, respectively.
Figure 3B:
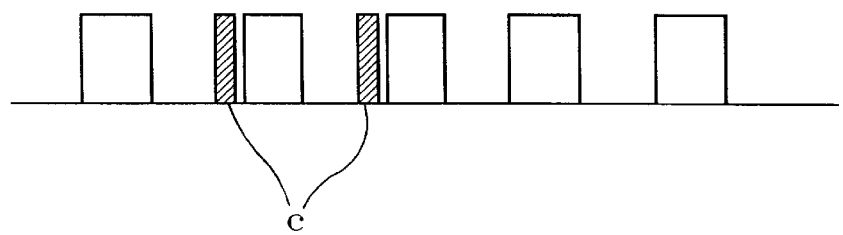

A correction efficiency can be further enhanced using the FIG. 4 apparatus together with the FIG. 1 apparatus.

As described above, the track cross signal correction apparatus according to the present invention can accurately perform a track seek operation in a medium such as a CD-ROM requiring high-speed access.

While only certain embodiments of the invention have been specifically described herein, it will apparent that numerous modifications may be made thereto without departing from the spirit and scope of the invention.

What is claimed is:

1. A track cross signal correction apparatus for removing noise components contained in a track cross signal, said track cross signal correction apparatus comprising:

means for comparing pulse widths of a received track cross signal with at least two threshold values based on the pulse width of a previous track cross signal, and generating at least two mask signals according to the comparison result; and correction means responsive to said at least two mask signals, for outputting a received track cross signal when said at least two mask signals are generated by said means.

2. The track cross signal correction apparatus according to claim 1, wherein said means comprises:

a first mask signal generator for comparing the pulse width of the received cross track signal having a high-level with a first threshold value based on the pulse width of a previous pulse having a high-level, and generating a first mask signal according to the comparison result; and a second mask signal generator for comparing the pulse width of the received track cross signal having a low-level with a second threshold value based on the pulse width of a previous pulse having a low-level, and generating a second mask signal according to the comparison result.

3. The track cross signal correction apparatus according to claim 2, wherein said first and second threshold values equal a fraction of the previous pulse width having a high-level and low-level, respectively.

4. The track cross signal correction apparatus according to claim 3, wherein said fraction is a half.

5. The track cross signal correction apparatus according to claim 3, wherein said fraction is a quarter.

6. The track cross signal correction apparatus according to claim 2, wherein each of said mask signal generators comprises:

a counter for counting the number of reference clock pulses during the time when the received track cross signal has a predetermined level and producing an output value;

a shift register for shifting the output value of said counter by a predetermined number of bits to the right and outputting the shifted result;

a register for temporarily storing and outputting the shifted result produced by said shift register; and a comparator for outputting a mask signal having a first level starting from the input of the count value from said counter, and continuously outputting said mask signal until the output value of said counter equals the output value of said register.

7. The track cross signal correction apparatus according to claim 2, wherein said correction means comprises:

an OR gate for logically summing the received track cross signal and said first mask signal;

a first AND gate for logically multiplying the received track cross signal and said second mask signal; and a second AND gate for logically multiplying an output of said OR gate and an output of said first AND gate, and outputting a corrected track cross signal.

8. A track cross signal correction apparatus for removing noise components contained in a track cross signal, said track cross signal correction apparatus comprising:

a comparator, receiving as an input a track cross signal, and being operative to compare a pulse width of said track cross signal with at least two threshold values, and to generate at least two mask signals according to whether the pulse width of said track cross signal is greater or less than said at least two threshold values; and a corrector, responsive to said at least two mask signals, and being operative to output a modified track cross signal when said at least two mask signals are generated by said comparator.

9. The track cross signal correction apparatus according to claim 8, wherein said comparator comprises:

a first mask signal generator, responsive to said track cross signal, and being operative to compare the pulse width of said track cross signal having a high-level with a first threshold value, and to generate said first mask signal based on whether the pulse width of said track cross signal is greater or less than said first threshold value; and a second mask signal generator, responsive to said track cross signal, and being operative to compare the pulse width of said track cross signal having a low-level with a second threshold value, and to generate a second mask signal based on whether the pulse width of said track cross signal is greater or less than said second threshold value.

10. The track cross signal correction apparatus according to claim 9, wherein each of said first and second threshold values equals a fraction of a pulse width of a previous track cross signal having a high-level and a low-level, respectively.

11. The track cross signal correction apparatus according to claim 10, wherein said fraction is a half.

12. The track cross signal correction apparatus according to claim 10, wherein said fraction is a quarter.

13. The track cross signal correction apparatus according to claim 9, wherein each of said first and second mask signal generators comprises:

a counter for counting the number of reference clock pulses during the time when the received track cross signal has a predetermined level and producing an output value;

a shift register for shifting the output value of said counter by a predetermined number of bits to the right and outputting the shifted result;

a register for temporarily storing and outputting the shifted result produced by said shift register; and a comparator for outputting a mask signal having a first level starting from the input of the count value from said counter, and continuously outputting said mask signal until the output value of said counter equals the output value of said register.

14. The track cross signal correction apparatus according to claim 9, wherein said corrector comprises:

an OR gate for logically summing said track cross signal and said first mask signal;

a first AND gate for logically multiplying said track cross signal and said second mask signal; and a second AND gate for logically multiplying an output of said OR gate and an output of said first AND gate, and outputting the modified track cross signal accordingly.

15. A method of removing noise components in a track cross signal correction apparatus comprising the steps of:

comparing pulse widths of a first track cross signal with at least two threshold values based on the pulse width of a second track cross signal;

generating at least two mask signals according to whether the pulse width of said first track signal is greater or less than said at least two threshold values; and outputting a modified track cross signal when said at least two mask signals have a predetermined value.

16. The method as defined in claim 15, further comprising the steps of:

comparing the pulse width of said first track cross signal having a high-level with a first threshold value based on the pulse width of the second track cross signal having a high-level;

generating a first mask signal according to the comparison result;

comparing the pulse width of said first track cross signal having a low-level with a second threshold value based on the pulse width of the second track cross signal having a low-level; and generating a second mask signal according to the comparison result.

17. The method as defined by claim 16, wherein each of said first and second threshold values equals a fraction of the pulse width of the second track cross signal having a high-level and low-level, respectively.

18. The method as defined by claim 17, wherein said fraction one of a half and a quarter.

19. The method as defined by claim 16, further comprising the steps of:

logically summing said first track cross signal and said first mask signal to produce a first result;

logically multiplying said first track cross signal and said second mask signal to produce a second result; and logically multiplying said first and second results to product said modified track cross signal.

* * * * *